UNITED STATES PATENT OFFICE 2,421,402

DIARYL - DIALKYL - ETHANE DERIVATIVES AND PROCESS FOR THE MANUFACTURE OF SAME

Erich Adler, Lidingo, near Stockholm, Sweden, assignor to Hoffmann-La Roche Inc., Nutley, N. J., a corporation of New Jersey No Drawing. Application August 22, 1945, Serial No. 612,120. In Sweden August 23, 1944

10 Claims. (Cl. 260—396)

This invention relates to the manufacture of $\alpha,\beta$-dialkylstilbenequinones, the 2,3-di-(p-hydroxy-aryl)-butadienes-(1,3) [either unsubstituted or substituted with alkyl radicals in positions 1 and 4], which are obtainable by rearrangement of the said stilbenequinones and the 1,2-di-(p-hydroxy-aryl)-1,2-dialkyl-ethanes obtained by reduction of the butadienes.

The first reaction step of the new process comprises oxidising 1,2-di-(p-hydroxy-aryl)-1,2-dialkyl-ethylenes with mild oxidising agents to the hitherto unknown $\alpha,\beta$-dialkylstilbenequinones. As starting materials trans-1,2-di-(p-hydroxy-aryl)-1,2-dialkyl-ethylenes, characterised by their strong oestrogenic activity, may be used as well as the less active cis-compounds. As mild oxidising agents PbO$_2$, FeCl$_3$, Ag$_2$O, and especially lead-tetra-acetate are suitable. It is advisable to carry out the oxidation in the presence of an inert solvent, such as ether, chloroform, benzene, ethylacetate, at room temperature. Primarily a blue-greenish quinhydrone compound is formed which readily changes into the quinone compound showing a red-yellowish colour.

The $\alpha,\beta$-dialkyl-stilbenequinones thus obtained possess remarkable oestrogenic activity. On catalytic hydrogenation of these compounds with platinum and hydrogen 1 mol of hydrogen is taken up and the trans-1,2-di-(p-hydroxy-aryl)-1,2-dialkyl-ethylenes showing stronger oestrogenic activity are mainly formed. By the cited 2 step reaction it is thus possible to transform the less active cis-compounds nearly quantitatively into the trans-compounds showing a higher oestrogenic activity. Finally, $\alpha,\beta$-dialkyl-stilbenequinones can be rearranged to oestrogenic active substituted or unsubstituted 2,3-di-(p-hydroxyaryl)-butadienes-(1,3). The butadienes may be transformed with good yields into 1,2-di-(p-hydroxy-aryl)-1,2-dialkyl-ethanes showing a specially high oestrogenic activity.

Up to now, $\alpha,\beta$-dialkyl-stilbenequinones could only be obtained in the form of brown-red resins, but not in crystallised form. $\alpha,\beta$-Dialkyl-stilbenequinones are stable only in neutral solution; this must be taken into consideration during the working up of the solutions. The compounds are easily soluble in ether, alcohol, and ethyl-acetate, less in chloroform and benzene, and hardly in hexane.

$\alpha,\beta$-Dialkyl-stilbenequinones are easily rearranged to 2,3-di-(p-hydroxy-aryl)-butadienes-(1,3) by the action of acid and alkali. With the exception of the rearrangement of $\alpha,\beta$-dimethyl-stilbenequinone, 2,3-di-(p-hydroxy-aryl)-butadienes-(1,3), substituted in positions 1 and/or 4 with alkyl radicals, are obtained; by rearrangement of $\alpha,\beta$-dimethyl-stilbenequinone 2,3-di-(p-hydroxy-phenyl)-butadiene-(1,3) unsubstituted in positions 1 and 4 is formed.

Acid rearrangement may be effected by concentrated organic acids as well as by organic acids in mixture with diluents; also dilute mineral acids are suitable. The rearrangement also takes place by the action of alkaline agents, such as aqueous alkaline solutions. Soda lye effects quick, sodium carbonate slower and bicarbonate of soda very slow rearrangement. Ammonia rearranges the compound in aqueous solution as well as in organic solvents. Also organic bases may be used for the purpose in question. The 2,3-di-(p-hydroxy-aryl)-butadienes-(1,3), substituted or unsubstituted in positions 1 and 4 with alkyl radicals, thus obtained, are crystallised, colourless compounds. They show oestrogenic activity. Remarkably, they are able to take up 2 mols of hydrogen during reduction and thereby to be transformed into 1,2-di-(p-hydroxy-aryl)-1,2-dialkyl-ethanes which show strong oestrogenic activity. These compounds exist in two forms, namely in the meso- and in the racem-form. The oestrogenic activity of the meso-form is far stronger and, consequently, it is important that reduction of 2,3-di - (p-hydroxy - aryl) - butadienes-(1,3) yields 50% or more of the meso-form, whereas direct reduction of 1,2-di-(p-hydroxy-aryl)-1,2-dialkyl-ethylene to 1,2-di-(p-hydroxy-aryl)-1,2-dialkyl-ethanes almost quantitatively leads to the racem-form the oestrogenic activity of which is only weak. The reduction of 2,3-di-(p-hydroxy-aryl)-butadienes-(1,3) to the 1,2-di-(p-hydroxy-aryl)-1,2-dialkyl-ethanes can be effected by the action of hydrogen iodide, preferably in the presence of phosphorus. The catalytic hydrogenation can be carried out especially well if palladium is used as catalyst.

The following examples illustrate the invention.

Example 1

3.7 parts by weight of diethyl-stilboestrol [1,2-di-(p-hydroxy-phenyl)-1,2-diethyl-ethylene] are dissolved in a mixture of 50 parts by volume of chloroform and 40 parts by volume of ether. 6.2 parts by weight of lead tetra-acetate (corresponding to 1 mol for each mol of stilbene) are added to the solution in small portions while stirring vigorously with a mechanical agitator. The next portion of lead tetra-acetate is only thrown into the solution after the colour of quinhydrone has disappeared and the colour of the solution has become red-yellow. At the end of the oxidation the solution containing α,β-diethyl-stilbenequinone is sucked off from the precipitation formed. The latter chiefly consists of lead diacetate which may be dissolved by treatment with water. Then only a small portion of precipitate undissolvable in water remains behind, which proves to consist of the lead salt of diethyl-stilboestrol, from which 0.15 part by weight of pure diethyl-stilboestrol may be regenerated by the aid of hot acetic acid. If instead of in a mixture of ether and chloroform the oxidation is carried out in benzene, a larger quantity of the lead salt of diethyl-stilboestrol is formed, whereas, if ethyl-acetate is used as solvent during the oxidation step, there results practically none of the said lead salt.

For the preparation of α,β-diethyl-stilbenequinone as such, the solution immediately after the oxidation is freed from the acetic acid formed from the lead tetra-acetate during the reaction by shaking out with concentrated bicarbonate solution. The solution is dried with anhydrous sodium sulphate and the solvent driven off in vacuo whereby higher temperatures must be avoided. α,β-Diethyl-stilbenequinone may thus be obtained as a brown-red resin, easily soluble in ether, alcohol, and ethyl acetate, less easily in chloroform, and hardly in hexane.

*Example 2*

It is not necessary to isolate α,β-diethyl-stilbenequinone for the rearrangement thereof, but the solution of the reaction leading to α,β-diethyl-stilbenequinone may be used directly after the precipitate has been sucked off. To this end the solution is diluted with 150 parts by volume of ether and then shaken out with 65 parts by volume of normal NaOH. The colour of the ether solution gradually disappears. 1,4-dimethyl-2,3-di-(p-hydroxy-phenyl)-butadiene-(1,3) is precipitated from the brownish alkaline layer by neutralisation and may be sucked off after standing in the ice-box. By recrystallisation from benzene colourless lancet-like plates or needles are obtained containing crystal-benzene which is lost on heating in vacuo, whereafter the crystals melt at 184–185° C. The yield calculated upon the initially used quantity of diethyl-stilboestrol amounts to 73% and, calculated upon the diethyl-stilboestrol consumed, to 76%. Upon warming 1,4-dimethyl-2,3-di-(p-hydroxy-phenyl)-butadiene-(1,3) for 30 minutes with pyridine-acetic acid anhydride the diacetate is obtained which after recrystallisation from alcohol shows a melting point of 147–148° C.

If 1,2-di-(p-hydroxy-phenyl)-1,2-dimethylethylene is treated as described in examples 1 and 2, 2,3-di-(p-hydroxy-phenyl)-butadiene-(1,3) is obtained after rearrangement of the α,β-dimethyl-stilbenequinone primarily formed. The melting point of the said butadiene is 166–167° C. The diacetate obtained according to the above indication melts at 129–130° C. after recrystallisation from alcohol.

The rearrangement of α,β-diethyl-stilbenequinone can be effected by normal sulphuric acid instead of soda lye. In this case the rearranged compound remains in the ethereal fraction of the solution which is washed with water and dried over anhydrous sodium sulphate. The residue obtained after driving off the ether, upon recrystallisation from benzene and removal of the crystal-benzene by warming in vacuo, yields the same 1,4-dimethyl-2,3-di-(p-hydroxy-phenyl)-butadiene-(1,3), melting at 184–185° C. Presumably this compound is cis-trans-isomeric to the diene-oestrol of melting point 226–227° C. first prepared by Dodds and collaborators. The new compound should therefore be named isodiene-oestrol.

*Example 3*

2.66 parts by weight of isodiene-oestrol are dissolved in 300 parts by volume of acetone, and palladium-charcoal, prepared by treating 5 parts by weight of charcoal with 1 part by weight of palladium chloride in 100 parts by volume of alcohol with hydrogen, is added. The mixture is shaken in hydrogen atmosphere. After 2½ hours the hydrogenation is terminated, 2 mols of hydrogen having been absorbed. The solution is filtered, the filtrate is concentrated to dryness and the residue is taken up in warm glacial acetic acid. From the latter the hexo-oestrol crystallises in a yield amounting to 50% or more. The meso-form of 1,2-di-(p-hydroxy-phenyl)-1,2-diethyl-ethane thus obtained shows a melting point of 180–183° C. From the mother liquor a small quantity of the racemic compound can be worked up.

In the same manner meso-1,2-di-(p-hydroxy-phenyl)-1,2-dimethyl-ethane of melting point 226–230° C. can be prepared from 2,3-di-(p-hydroxy-phenyl)-butadiene-(1,3).

I claim:

1. Process for the manufacture of di-(p-hydroxyaryl)-dialkyl-ethanes, comprising treating 1,2-di-/p-hydroxy-aryl/-1,2-dialkyl-ethylenes with mild oxidants and rearranging the α,β-dialkyl-stilbenequinones formed into butadienes of the formula

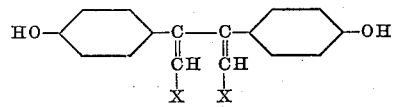

wherein X is selected from the group consisting of hydrogen and alkyl radicals, by treatment with a reagent selected from the group consisting of acids and alkalis.

2. Process for the manufacture of di-(p-hydroxyaryl)-dialkyl-ethanes, comprising treating 1,2-di-/p-hydroxy-aryl/-1,2-dialkyl-ethylenes with mild oxidants and rearranging the α,β-dialkyl-stilbenequinones formed into butadienes of the formula

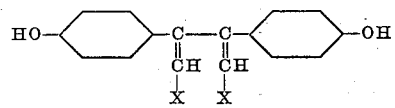

wherein X is selected from the group consisting of hydrogen and alkyl radicals, by treatment with a reagent selected from the group consisting of acids and alkalis, and reducing the said butadienes into 1,2-di-/p-hydroxy-aryl/-1,2-dialkyl-ethanes.

3. The compound α,β-dialkyl-stilbenequinone.

4. In a process for the manufacture of di-(p-hydroxy-phenyl)-diethyl-ethane, the step which comprises treating diethyl-stilboestrol with a mild oxidant.

5. In a process for the manufacture of di-(p-hydroxy-phenyl)-diethyl-ethane, the step which comprises treating diethyl-stilboestrol with an oxidant selected from the group consisting of lead tetra-acetate, lead dioxide, iron trichloride, and silveroxide.

6. Process for the manufacture of di-(p-hydroxy-phenyl)-diethyl-ethane, comprising treating diethyl-stilboestrol with a mild oxidant and rearranging the $\alpha,\beta$ - diethyl - stilbenequinone formed into isodiene-oestrol by treatment with a substance selected from the group consisting of dilute acids and alkalis.

7. Process for the manufacture of di-(p-hydroxy-phenyl)-diethyl-ethane, comprising treating diethyl-stilboestrol with a mild oxidant and rearranging the $\alpha,\beta$ - diethyl - stilbenequinone formed into isodiene-oestrol by treatment with a substance selected from the group consisting of dilute acids and alkalis and reducing the said isodiene-oestrol to hexoestrol.

8. The compound $\alpha,\beta$-diethyl-stilbenequinone.

9. A process as in claim 1 in which the mild oxidant is lead-tetra-acetate.

10. A process as in claim 6 in which the mild oxidant is lead-tetra-acetate.

ERICH ADLER.

REFERENCES CITED

The following references are of record in the file of this patent:

Dodds et al., Nature, July 2, 1938, vol. 142, p. 34.
Euler et al., The Svedberg Mem. (1944), pp. 246–259. (Copy in Library of Congress.)
Beilstein, Handbuch der Organische Chemie, vol. VII, p. 767.